Oct. 1, 1940.　　　　C. A. BREWER　　　　2,216,466
MOTOR VEHICLE CLUTCH CONTROL
Original Filed Oct. 24, 1928　　　3 Sheets-Sheet 1

INVENTOR.
Charles A. Brewer
BY
McConkey & Smith
ATTORNEY.

Oct. 1, 1940.   C. A. BREWER   2,216,466
MOTOR VEHICLE CLUTCH CONTROL
Original Filed Oct. 24, 1928   3 Sheets-Sheet 2

INVENTOR.
Charles A. Brewer
BY
McCoskey & Smith
ATTORNEY.

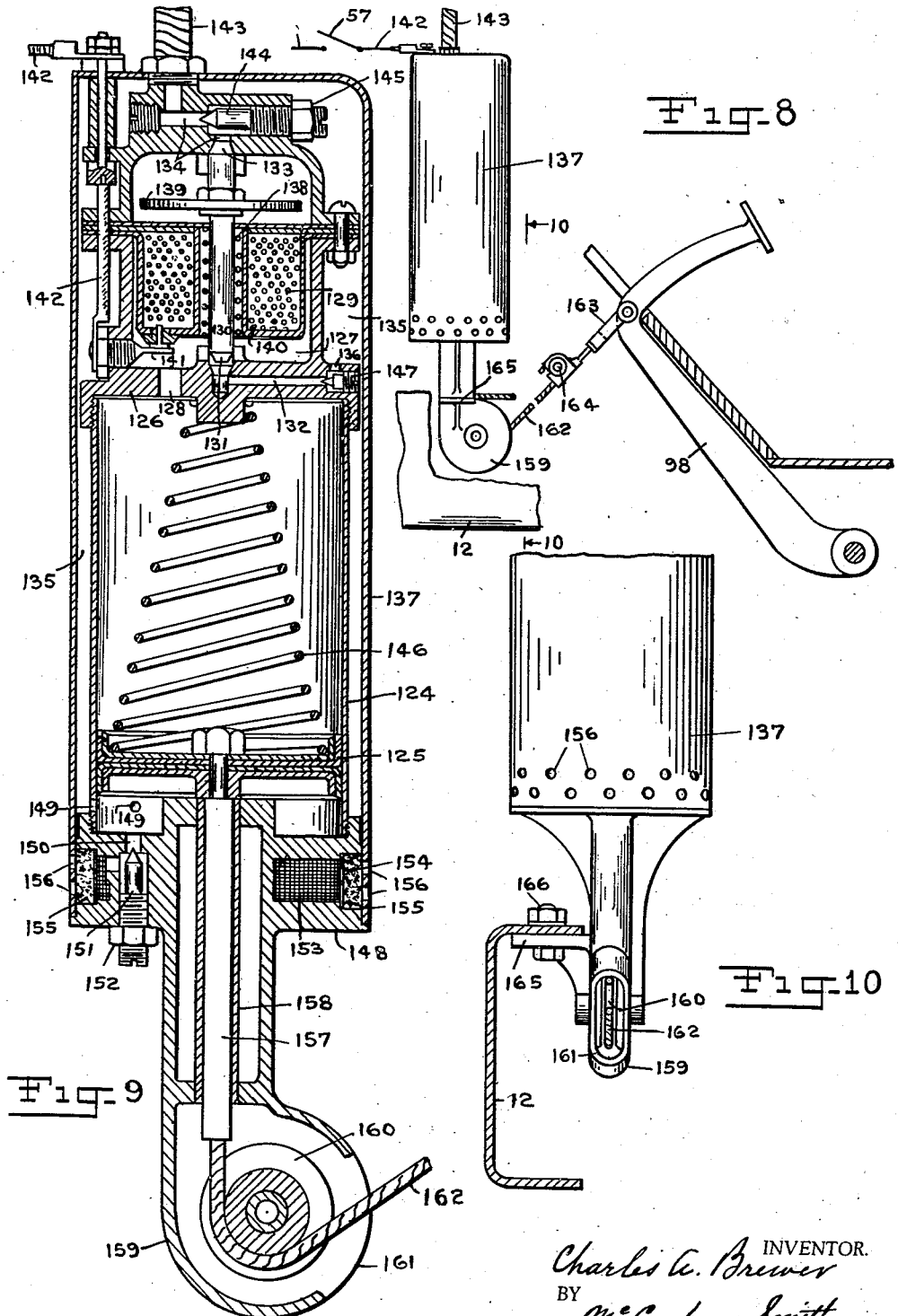

Patented Oct. 1, 1940

2,216,466

UNITED STATES PATENT OFFICE 2,216,466

MOTOR VEHICLE CLUTCH CONTROL

Charles A. Brewer, Noroton Heights, Conn., assignor of one-half to Philip J. Kury, Arverne, N. Y.

Original application October 24, 1928, Serial No. 314,627. Divided and this application April 19, 1935, Serial No. 17,323

8 Claims. (Cl. 192—91)

This invention relates to control mechanism for motor vehicles and has for an object to provide an improved control mechanism which will facilitate operation of the vehicle and provide power means for operating the various control means, and which will provide improved control means which will place the entire control in one hand of the operator.

It is also an object of the invention to provide a control mechanism which will give more complete, uniform and better control and thus tend toward safer operation of the vehicle.

This application is a division of my copending application for Motor vehicle control, Serial No. 314,627, filed October 24, 1928, and renewed November 28, 1933, which has become Patent No. 2,045,516, issued June 23, 1936.

With the foregoing and other objects in view, the invention consists in certain novel features of construction, combinations and arrangements of parts, as will be more fully disclosed in connection with the accompanying drawings. In these drawings:

Fig. 8 is a detail side elevation, with parts broken away, showing a second embodiment of the invention;

Fig. 9 is a vertical section on an enlarged scale through the power unit of Fig. 8; and Fig. 10 is an elevation, partly in section and with parts broken away, as viewed along line 10—10 of Fig. 8.

Figure 1:
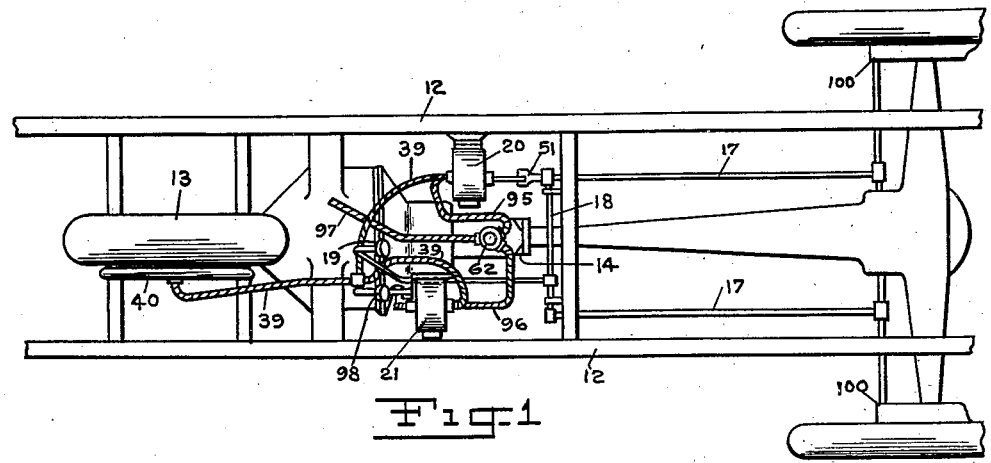
Fig. 1 is a diagrammatic top plan view of a chassis of an automobile showing my improved control applied thereto for controlling the operation of the clutch and brake mechanism.
Figures 2, 3:
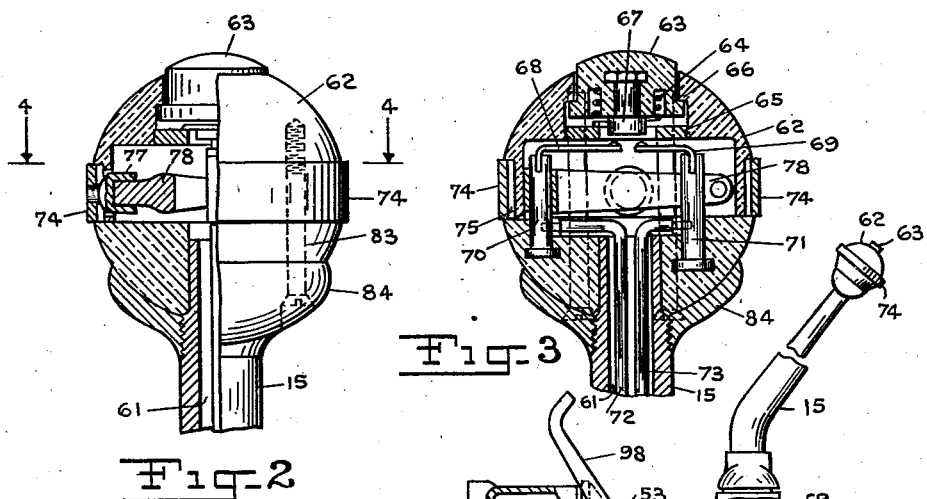
Fig. 2 is a partial side elevation and partial section of the upper end of the gear shift lever.
Fig. 3 is a vertical section of the upper end of the lever taken at right angles to the plane of the section of Fig. 2, the section being substantially on line 3—3 of Fig. 4.
Figure 4:
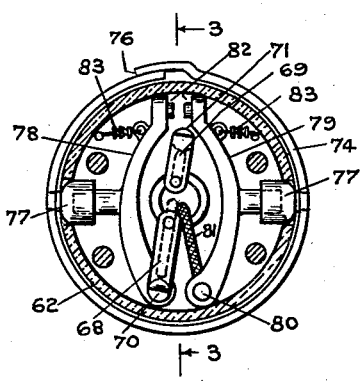
Fig. 4 is a section taken on line 4—4 of Fig. 2.

In the illustrated embodiment, a frame of a motor vehicle is indicated at 12 with the motor at 13 and the selective gear transmission at 14 controlled by the gearshift lever 15 in the usual manner. Any suitable type of clutch 16 is provided between the motor and the transmission, and the brake mechanism is shown diagrammatically at 17 and 18 operated by foot pedal 19 and a power device 20, a similar power device 21 being connected to the clutch for releasing the same. Power units 20 and 21 may be substantially like that shown in Fig. 7 and hereinafter described in detail. It is to be expressly understood, however, that I do not limit my invention to the particular type of motor construction shown in Fig. 7, but may employ other suitable types of power units.

Figure 7:
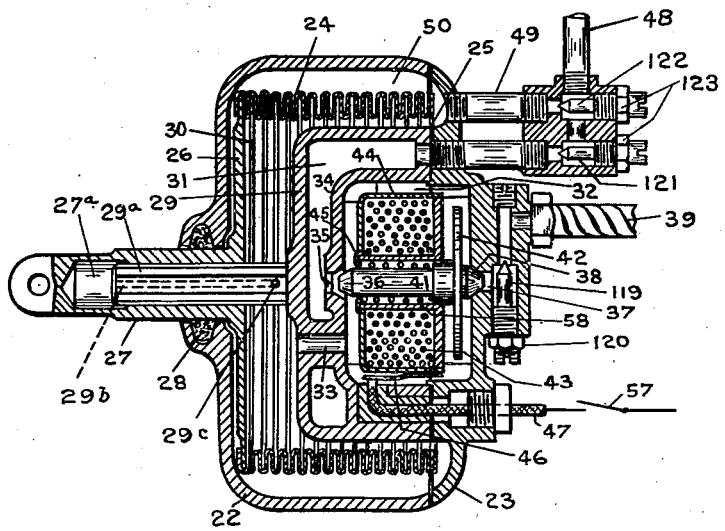
Fig. 7 is a detail section of a preferred form of power unit for carrying out the invention.

The power units 20 and 21 illustrated are operated by suction from any suitable source, such as the intake manifold of the engine. The specific construction of units 20 and 21 is illustrated in Fig. 7. The unit as shown comprises an outer casing made in two sections, the body section 22 and the cap or cover section 23 connected together by suitable screws. Secured to the cover section at one end is a flexible diaphragm 24, the particular diaphragm shown being a metal bellows construction which is secured to the cover by means of a packing disc 25. The other end of the bellows is closed by a movable head 26 which has an extension or rod 27 passing through the end wall of body member 22, said rod being surrounded by a suitable packing 28 to prevent the entrance of dirt and moisture. Also secured to the section 23 and forming a part of the casing is an extension 29 projecting into the space 30 within the diaphragm to help fill this space and reduce the amount of air contained therein to be withdrawn by the suction when the device is operated and thus reduce the lag in its operation and give quicker functioning of the unit. It also provides convenient means for mounting the control valve mechanism to be hereinafter described.

Extension 29 as shown is double walled to provide a passage 31, and it also forms a chamber 32 communicating with space 30 through one or more conduits 33. The inner wall 34 of the extension has an opening 35 connecting chamber 32 with passage 31, said opening being controlled by a movable valve 36. Cap 23 has a passage 37 leading to chamber 32 which is controlled by a valve 38, and this passage 37 is connected by a suitable flexible conduit 39 with any suitable source of suction, such as intake manifold 40 of the motor. The effective area of passage 37 may be adjusted and set by a valve 119 which may be secured in adjusted position by a lock nut 120.

The two valves 36 and 38 are mounted on a rod 41 so that they move together. This rod and its head 42 form the armature of solenoid 43 which surrounds the rod and is mounted in a suitable casing 44. One end of this solenoid is grounded through the casing at 45 and the other end leads through an insulated contact 46 to an insulated conductor 47. The passage 31 is connected through a suitable conduit 48 with the atmosphere, and a branch 49 communicates with the space 50 outside of the diaphragm 24. The effective area of these two branches may be controlled by adjustable valves 121 and 122 respectively, which valves, after adjusting, may be secured in adjusted position by lock nuts 123. It will be noted that chambers 30 and 50 constitute the right-hand and left-hand ends respectively of casing 22, 23 as the latter is divided by head 26 and diaphragm 24.

The extension 27 of member 26 is connected by any suitable connection to the mechanism to be operated, such as a brake or a clutch. In Fig. 1 this extension on unit 20 is connected by a link 51 with rod 18 for operating the service brake 100, and the extension 27 of unit 21 is connected to an operating lever 52 (Fig. 5) for releasing the clutch 16. Lever 52 may be pivoted to the frame or clutch housing at 53 and operate through the sleeve 54 on the clutch shaft. The units 20 and 21 are mounted by any suitable support, but are preferably pivoted by suitable trunnions as shown at 55 (Fig. 5) on the casing of the unit and mounted in a suitable bracket 56 secured to the frame or other suitable part of the vehicle. This pivotal mounting for the unit permits it to rock, if necessary, when it is operated.

In the illustrated embodiment, unit 21 operates from the suction of the motor or any suitable source when a control switch, indicated diagrammatically at 57 (Fig. 7), is closed. Electric current from any suitable source to which conductor 47 is connected energizes solenoid 43 and shifts the rod 41 carrying valves 36 and 38 to the left, as viewed in Fig. 7, against action of a spring 58 surrounding rod 41. This closes the passage 35 and opens passage 37, permitting the suction to withdraw air from space 30 within the diaphragm 24 and reducing the pressure therein. This causes atmospheric pressure on the head or piston 26 to force the same to the right, as viewed in Fig. 7, shifting the extension 27 and operating whatever mechanism to which this extension is connected. When switch 57 is again opened, solenoid 43 is deenergized permitting the spring 58 to shift valves 36 and 38 to the right, as viewed in Fig. 7, thus closing passage 37 and opening passage 35. This permits atmospheric pressure to enter the space 30, thus tending to equalize pressures on opposite sides of piston 26 and diaphragm 24 and permitting the former, with extension 27, to move back to its original position, either under the spring action of the diaphragm or a suitable spring on the mechanism operated thereby, as, for example, the usual clutch spring, not shown.

Secured to the extension 29 of the unit illustrated in Fig. 7 is a rod 29a which is exteriorly splined to engage corresponding grooves formed interiorly of the hollow rod 27. Rod 29a is provided with a longitudinal passage 29b extending from the left-hand end thereof to a radial passage 29c which opens into space 30. The rod 29a thus acts as a guide for the rod 27, and passage 29b, 29c acts as a bleed for air trapped in chamber 27a, thus equalizing the pressures in the latter chamber and space 30.

The controls for the two units 20 and 21 for operating the brake and clutch respectively are mounted on the gearshift lever 15. This lever is mounted on a suitable housing 59 in the usual manner to permit the required movements for shifting the gears. It has the usual extension 60 connected to the gearshift mechanism. This lever has a longitudinal passage 61 for electrical conductors for the units. The lever is provided at its upper end with a grip 62 in the shape of a ball or knob of insulating material. Mounted in this grip and projecting from the upper end thereof is an insulating button 63 which is mounted for limited sliding movement in the grip and, as shown, is movable longitudinally of the axis of the lever. A spring 64 reacting against this button and a permanently mounted disc 65 tends to force this button upwardly, which movement is limited by a shoulder 66. The button carries a metal contact 67 which when in its depressed condition engages and bridges the two contacts 68 and 69. These contacts are carried on suitable posts 70 and 71 respectively mounted in the grip and to which are connected the lead wires 72 and 73 respectively. One of these lead wires, as the lead wire 72, is connected to a suitable source of current, such as the battery or generator of the vehicle, while the other conductor 73 leads to the brake operating unit 20. Therefore, the conductor 73 corresponds to the conductor 47 in Fig. 7, and the switch 67, 68, 69 corresponds to the switch 57 of Fig. 7. It will therefore be obvious that when the button 63 is depressed the circuit to the brake unit 20 will be closed, causing this unit to function to apply the brakes.

Also mounted on the grip 62 is a control switch for the unit 21 for releasing the clutch. This switch is mounted in the side of the grip so that it may be closed by pressing inwardly on the sides thereof. In the form shown, it comprises a resilient contractible ring 74 mounted in a suitable groove 75 in the grip, this ring being split as shown at 76. Said ring is connected by means of insulating elements 77 with switch levers 78 and 79. The lever 78 is pivoted on the stud 70, while the lever 79 is pivoted on a suitable stud 80 from which a conductor 81 leads through the lever passage 61 to the unit 21. The two levers 78 and 79 are movable toward each other at their free ends where they carry switch contacts 82, the latter being normally held out of engagement with each other by springs 83. Therefore, the conductor 81 corresponds to conductor 47 of Fig. 7, while the switch 82 corresponds to the control switch 57 in Fig. 7. It will therefore be apparent that when the ring 74 is compressed, the switch 82 is closed, closing the circuit to the unit 21 which will release the clutch. When the spring 74 is released, switch 82 is opened, permitting the clutch to engage. The grip or knob 62 is mounted on the free end of the gearshift lever 15 by any suitable means, such as screws 83, passing through the cupped flange 84 threaded or otherwise secured to the lever.

Figure 5:
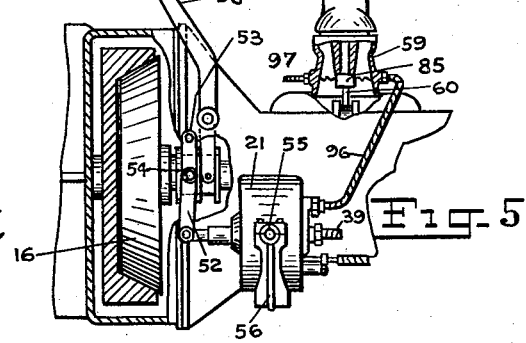
Fig. 5 is a partial side elevation and partial vertical section showing the gearshift lever and the power device for releasing the clutch.
Figure 6:
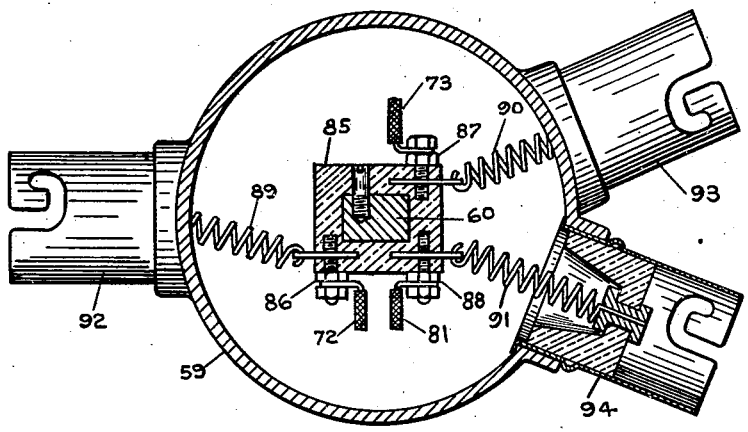
Fig. 6 is a detail transverse section of a lower portion of the gearshift lever and the mounting therefor.

The connections from the conductors 72, 73 and 81 are preferably made as shown in Figs. 5 and 6. For this purpose, an insulating block 85 is mounted on the extension 60 of the lever, and the conductors 72, 73 and 81 are connected to binding posts 86, 87 and 88, respectively, mounted on this block. Flexible coil conductors 89, 90 and 91 lead from these binding posts, respectively, to suitable sockets 92, 93 and 94 mounted on the support 59 from which they are connected by suitable conductors in armored flexible conduits 75 to the various units and the battery or other source of current. The flexible conduit to the unit 20 is shown at 95 and is connected to the socket 93 by a suitable detachable connection. The conduit 96 leads to the unit 21 and is connected by a suitable detachable connection to the socket 94, while the conduit 97 is connected by a suitable detachable connection to the socket 92 and is connected to the battery or other suitable source of current, not shown.

Although the service brake is applied and the clutch is released by the power units, the usual pedal operating means for applying the brake and releasing the clutch are shown at 19 and 98 respectively, and these two pedals operate in the usual manner for applying the service brake and releasing the clutch. Thus, if either of the units 20 or 21 fails, the brake may be applied or the clutch released in the manner now generally employed, or both of these pedals may be used, if desired, for supplementing the action of the units 20 and 21. If the operator wishes to control the brake and clutch by the feet, as is now the general practice, he may do so independently of the power units 20 and 21 or he may use the brake pedal to assist the power unit 20 and thus increase the braking effect.

However, in normal operation, when the operator wishes to apply the brake, he may merely rest his hand on top of the grip 62 to thus depress the button 63 and render the power unit 20 effective to apply the service brake. He may then press inwardly on the ring 74 to render power unit 21 effective to release the clutch after which he may, by manipulating the lever 15 in the usual manner, shift the gears, if desired, or if preferred, he may release the clutch without applying the brake and then shift the gears in the usual manner. It will therefore be obvious that this mechanism places the entire control of the car in one hand of the operator, but he may, if desired, apply the brakes or release the clutch with the foot pedals in the usual manner. As it is the natural action of the hand to grip the sides of the knob 62 in shifting gears, the natural and practically unconscious action will be, with this device, to first release the clutch and then shift the gears. The natural action is always to release the clutch before shifting the gears, and this device, therefore, tends to reduce and practically eliminate the liability of grinding the gears when shifting. It will also be obvious that practically no effort is required on the part of the operator in applying the brakes, and as the brake unit 20 may be set by suitably designing the various air inlets to operate uniformly or by adjusting the valves 119, 121 and 122, the brakes will never set with a too sudden action but are always applied uniformly, thus reducing sudden strains on the vehicle and tending toward more comfortable operation with less fatigue to the occupants. The gradual application of the brakes may be obtained by adjustment of valve 119 toward closed position to insure that the braking force will not be applied too rapidly when valve 38 is opened. Valves 121 and 122 are adjusted toward full opened position to insure quick release of the brakes when solenoid 43 is deenergized.

The unit 21 also gives uniform engagement of the clutch, the speed of engagement being controlled and set by the valves 121 and 122, preventing too sudden engagement, eliminating sudden jerks incident to too rapid engagement of the clutch, and reducing strains on the car and fatigue to the occupants. In other words, the installation tends toward more uniform and proper operation of the vehicle. In the proper operation of the vehicle, as is well known to those skilled in the art, the clutch parts are permitted to move quite rapidly toward engaged position to substantially the point of initial engagement of the driving surfaces. Thereafter, the parts are retarded during the actual engagement of said surfaces, which preferably takes place at a uniform speed, as pointed out above. Accordingly, valves 119, 121 and 122 of unit 21 are adjusted to insure an initial rapid return movement of piston member 26 and the controlled clutch surfaces toward engaged position, and a retarded movement at and for a brief time subsequent to the time the friction surfaces of the clutch engage. To obtain this operation, valve 122 is adjusted toward closed position, while valve 121 is adjusted toward open position. When suction is introduced into the right-hand end of the casing, i. e. into chamber 30, rod 27 and member 26 will be moved to the right to disengage the clutch surfaces against tension of the clutch spring (not shown), the speed of this movement being controlled by the adjustment of valve 119. When solenoid 43 is deenergized, the suction connection is interrupted and air flows into the right-hand end of casing 22, 23 from chamber 31 and from atmosphere past valve 121. The clutch surfaces are thereupon rapidly moved toward engaged position by means of the usual clutch spring. This rapid movement tends to decrease the air pressure acting on the right-hand face of member 26 because of the restricted air inlet 121. The port for valve 122 has been sufficiently restricted to insure that the rapid movement of member 26 to the left will compress the air in the left-hand end of the casing so that member 26 will have its speed of movement reduced at substantially the instant the clutch surfaces engage. The pull of the clutch spring is at this instant rendered substantially ineffective due to the resistance offered by the engagement of the clutch surfaces plus the compression resistance in the left-hand end of casing 22, 23 and to a certain extent by the reduced pressure in the other end of said casing created by the aforementioned initial rapid movement of member 26 to the left. As air is expelled past valve 122, the compression is destroyed and the clutch surfaces are slowly and completely engaged under the action of the clutch spring. If it is desired to operate the clutch and brake manually and without the use of the power unit, valve 119 may be completely closed.

In Figs. 8 to 10, I have shown in detail a somewhat different type of power means which may be employed to operate the clutch or brakes in the same manner as the unit shown in Fig. 7. This unit functions in somewhat the same manner as the unit shown in Fig. 7 except that the movable power element is not provided with a diaphragm and it is connected to the brake or clutch in a somewhat different manner. It may be connected somewhat more readily directly to the clutch or brake pedal, thus adapting it to be applied somewhat more readily to existing installations. The unit comprises a cylinder 124 in which is mounted a reciprocating piston 125. The upper end of the cylinder is closed by a head 126 which has a chamber 127. The interior of the cylinder 124 above the piston communicates with the chamber 127 through the passage 128. Mounted in this chamber 127 is a solenoid 129 corresponding to the solenoid 43 of the unit of Fig. 7, and this solenoid surrounds a rod 130 carrying at one end a valve 131 controlling a passage 132, and at its other end carrying a valve 133 controlling a passage 134. The passage 132 forms a communication between the chamber 127 and the space 135 outside the cylinder, which communication with this space is shown at 136. The entire internal structure comprising the cylinder 124 in the head 126 with associated elements is enclosed within an outer casing 137 which thus forms the chamber 135. The rod 130 is surrounded by a spring 138 which tends to move the rod 130 and the valves carried thereby upwardly to close the valve 133. The rod 130 and the head 139 forms the armature for the solenoid 129 and this solenoid when energized tends to shift the rod 130 against the action of the spring 138. One end of the solenoid is grounded as shown at 140, and the other end is connected by a contact 141 to a lead 142 leading to any suitable control switch, such as any switch corresponding to the switch 57 of Fig. 7. That is, the lead 142 corresponds to either of the leads 95 or 96 of Fig. 1.

The passage 134 leads to the chamber 127 and is connected by a flexible conduit 143 to any suitable source of suction, such as the intake manifold 40 of the motor 13. This connection 143, therefore, corresponds to the connection 39 of the unit shown in Fig. 7. The effective area of the passage 134 may be adjusted and determined by an adjustable valve 144 which may be secured in adjusted position by a lock nut 145.

A coil spring 146 is mounted between the upper side of the piston 125 and the head 126 so that it tends to force the piston downwardly. The spring is preferably conical so that it may collapse into a shorter space, and its use insures that the piston will be moved to the end of the cylinder whereby the usual clutch lever spring is effective to move said lever to such a position as to prevent wear in the clutch trunnion bearing. The effective area of passage 132—136 may be determined by an adjustable valve 147.

The lower end of the cylinder 124 is closed by a head 148 and this head also closes the lower end of the casing 137. The space in the cylinder below the piston 125 communicates with the space 135 outside the cylinder through one or more openings 149 in the wall of the cylinder. The space in the cylinder below the piston also communicates with the outer atmosphere through a passage 150 the effective area of which may be adjusted and determined by an adjustable valve 151 which is secured in adjusted position by a lock nut 152. In the construction shown, the passage 150 leads to an annular chamber 153 in the head 148 which is closed by a screen 154 and a fibre packing 155 which is mounted between this screen and the casing 137, the casing being provided with suitable openings 156 leading to this fibre packing or screen. The fibre is sufficiently loose to permit the flow of air therethrough but forms a screen or strainer to prevent entrance of dust and dirt to the mechanism in the casing.

The piston 125 is connected to a piston rod 157 mounted for sliding movement in a bearing sleeve 158 carried by the head 148, and this head is also extended to provide an enclosed bearing 159 for pulley 160. The bearing casing 159 has an opening at one side thereof as shown at 161 for passage of a flexible connection, such as a wire cable 162, which passes over the pulley 160 and is connected to the piston rod 157. At its other end this cable is connected through a suitable link 163 with the clutch pedal 98, or if desired, it may be connected to the brake pedal 19 in the same manner. There may be an adjustable connection 164 in the cable to adjust it to the proper length and take up slack. The extension of the head 148 also includes a side bracket 165 providing means by which the unit may be mounted on the side member 12 of the car frame by any suitable means, such as the bolts 166.

This unit operates in substantially the same manner as the unit of Fig. 7. That is, closing the switch 57 corresponding to either the switch controlled by button 63 or ring 74, or any other suitable control switch, energizes the solenoid 129. This shifts the valves 131 and 133 downwardly closing the passage 132 to the atmosphere and opening the passage 134 leading to the source of suction, as the intake manifold. This suction reduces the pressure in the cylinder 124 above the piston and draws the piston upwardly, or rather the piston is forced upwardly by the pressure of the external atmosphere on the under side of the piston. This action, of course, will draw down the pedal to which the cable 162 is connected either releasing the clutch or applying the brake depending onto which element the unit is connected. When the switch 57 is opened the valves 131, 133 are forced upwardly under action of the spring 138, thus closing the passage 134 to the suction and opening the passage 132 to the atmosphere. This provides pressure on both sides of the piston permitting the spring 146 to force the piston downwardly and permit the clutch to engage or to release the brake. The speed of operation of the piston under the action of the suction may be controlled by adjusting the valve 144. It, therefore, determines the rate at which the pressure is reduced above the piston. The speed of movement of the piston may also be controlled or determined by adjusting the valve 151. The valves 151 and 147, by controlling entrance of atmospheric air, also determine the speed at which the clutch may be engaged or the brake released.

With this type of unit it is somewhat easier to secure a greater stroke than with the diaphragm unit of Fig. 7. It can, therefore, be attached to the brake or clutch lever a considerable distance from the pivot for this lever as indicated in Fig. 8, and it will give the necessary movement for properly operating the lever. This gives greater leverage so that a smaller unit of less power may be used. The unit can be attached to cars already assembled and in service if desired. The flexible cable 162 permits operation of the pedal by the foot of the operator independently of the unit.

Although only two embodiments of the invention have been illustrated and described, it is to be expressly understood that the same is not limited thereto but that various changes may be made in the design and arrangement of parts illustrated without departing from the spirit and scope of the invention, as will now be apparent to those skilled in the art. Reference will be had primarily to the appended claims for a definition of the limits of the invention.

What is claimed is:

1. In an automotive vehicle provided with a clutch, power means for operating said clutch comprising a double-ended pressure differential operated motor, the power element of which includes a flexible diaphragm dividing the motor into two compartments, and separate, independent valve means for controlling the gaseous pressure within each of said compartments for controlling the clutch disengaging operation of said motor and for varying the resistance of said motor to the engaging movement of the clutch.

2. In a vacuum operated power device for a motor vehicle clutch, a hollow container, movable means within said container dividing the same into two chambers, means for connecting said movable means to the clutch, means connecting one of said chambers to a source of subatmospheric pressure to move said movable means for disengaging the clutch, valve means for controlling said connection, an adjustable valve controlling the admission of atmosphere to said last named chamber, and an adjustable valve connecting the other of said chambers to atmosphere for controlling the flow of air into and out of the same whereby the engagement of the clutch is retarded substantially at the point of initial engagement of the clutch surfaces.

3. In a clutch control device for motor vehicles, a suction operated power device connected to the clutch and capable of releasing the same, said device comprising a hollow container, means in said container movable relatively thereto and dividing the same into two compartments, means for connecting one of said compartments to a source of vacuum for disengaging the clutch, means connecting said compartments to atmosphere, and valve means for controlling said connecting means for rendering said device operable to disengage the clutch and for varying the resistance of said device to the engaging movement of the clutch.

4. In an automotive vehicle provided with a clutch, power means for operating the clutch comprising a pressure differential operated motor, the latter including a cylinder member and a reciprocable piston member within the cylinder and operably connected to the clutch, solenoid operated valve means housed within one end of the cylinder and operable to, in part, control the clutch disengaging and engaging operations of the motor, and other valve means housed within the other end of the cylinder for, in part, controlling said operations of the motor.

5. In an automotive vehicle provided with a clutch, power means for operating the clutch comprising a pressure differential operated motor, the latter including a hollow container and a reciprocable member within the container connected to the clutch and adapted to be reciprocated by fluid pressure to disengage the latter, means connecting one end of said container to a source of subatmospheric pressure, a valve for controlling said connecting means and operable to, in part, control the clutch disengaging and engaging operations of the motor, a solenoid for operating said valve, and other valve means controlling communication with the other end of said container for, in part, controlling said operations of the motor to vary the resistance of the latter to the engaging movement of the clutch.

6. In an automotive vehicle provided with a clutch, power means for actuating the clutch comprising a vacuum operated motor, the latter including a hollow container and a reciprocable member within said container, means operably connecting said reciprocable member to the clutch, said last named member being adapted to be actuated by fluid pressure in said motor for disengaging said clutch, solenoid operated valve means for controlling connections between one end of said container, a source of vacuum and atmosphere and operable to, in part, control the clutch disengaging and engaging operations of the motor, and other valve means controlling communication between the other end of said container and atmosphere for, in part, controlling said operations of the motor to vary the resistance of the latter to the engaging movement of the clutch.

7. In a vacuum power device for engaging and disengaging a motor vehicle clutch, a casing, reciprocable means in said casing, means for operatively connecting the reciprocable means to the clutch, a connection between said casing and the intake manifold of the vehicle motor, a valve for controlling said connection, a second valve for adjusting said connection, a valve for controlling the admission of air into one part of the casing, and an adjustable valve for varying the flow of air to another part of the casing whereby the engagement of the clutch is retarded substantially at the point of initial engagement of the clutch surfaces.

8. In a vacuum operated power device for a motor vehicle clutch, a vacuum casing having a suction chamber and a compression chamber, reciprocable means within the casing, means for operatively connecting the reciprocable means to the clutch, a connection between the casing and the intake manifold of the engine, and valve means for controlling the gaseous pressure within the two chambers of the casing including a valve for controlling the connection to the intake manifold, a valve for controlling the admission of air into the suction chamber of the casing, and an adjustable valve varying the admission of air into the compression chamber of the casing whereby the engagement of the clutch is retarded substantially at the point of initial engagement of the clutch surfaces.

CHARLES A. BREWER.